US009316124B2

(12) United States Patent
Jin et al.

(10) Patent No.: US 9,316,124 B2
(45) Date of Patent: Apr. 19, 2016

(54) POWER GENERATING SYSTEM AND METHOD BY COMBINING MEDIUM-AND-LOW TEMPERATURE SOLAR ENERGY WITH FOSSIL FUEL THERMOCHEMISTRY

(71) Applicant: INSTITUTE OF ENGINEERING THERMOPHYSICS, CHINESE ACADEMY OF SCIENCES, Beijing (CN)

(72) Inventors: Hongguang Jin, Beijing (CN); Qibin Liu, Beijing (CN); Hui Hong, Beijing (CN); Jun Sui, Beijing (CN); Wei Han, Beijing (CN)

(73) Assignee: INSTITUTE OF ENGINEERING THERMOPHYSICS, CHINESE ACADEMY OF SCIENCES, Beijing (CN)

( * ) Notice: Subject to any disclaimer, the term of this patent is extended or adjusted under 35 U.S.C. 154(b) by 219 days.

(21) Appl. No.: 14/345,465

(22) PCT Filed: Nov. 13, 2012

(86) PCT No.: PCT/CN2012/084522
§ 371 (c)(1),
(2) Date: Mar. 18, 2014

(87) PCT Pub. No.: WO2014/075219
PCT Pub. Date: May 22, 2014

(65) Prior Publication Data
US 2014/0373536 A1 Dec. 25, 2014

(51) Int. Cl.
*F02C 1/00* (2006.01)
*F03G 6/00* (2006.01)
*F01K 23/02* (2006.01)
(Continued)

(52) U.S. Cl.
CPC . *F01K 23/02* (2013.01); *C01B 3/22* (2013.01); *C01B 3/32* (2013.01); *F01K 15/00* (2013.01);
(Continued)

(58) Field of Classification Search
CPC ......... F01K 23/02; F01K 15/00; F03G 6/065; C01B 3/22; C01B 3/32; C01B 2203/1005; C01B 2203/0855; Y02P 20/134
USPC ................................ 60/39.01, 641.8–641.15
See application file for complete search history.

(56) References Cited

U.S. PATENT DOCUMENTS

5,444,972 A * 8/1995 Moore ...................... F02C 1/05
60/39.182
7,654,073 B2 * 2/2010 Primlani .................... F02C 1/05
244/30
(Continued)

*Primary Examiner* — Hoang Nguyen
(74) *Attorney, Agent, or Firm* — Posz Law Group, PLC (57) ABSTRACT

The present invention provides a power generating system by combining medium-and-low temperature solar energy and fossil fuel with thermochemical process, the system comprising: a material supply device configured to store fossil fuel; a material mixing device configured to mix the fossil fuel with non-reacted reactant; a material metering device configured to control an amount of material fed to a material preheating device in unit time; a material preheating device configured to heat the material; a solar energy absorption and reaction device configured to drive the fossil fuel by using solar thermal energy absorbed to make a decomposition reaction or reforming reaction, through which the solar energy is converted to chemical energy of hydrogen-rich fuel, obtaining solar-energy fuel; a solar energy heat collecting device configured to collect the solar energy with low energy flux density to medium-and-low temperature solar thermal energy with high energy flux density, so as to provide heat to decomposition reaction or reforming reaction; a condenser configured to cool reaction products; a gas-liquid separating device configured to perform gas-liquid separation for the cooled mixture; a fuel bypassing device configured to adjust a proportion of solar-energy fuel for storage to that for generating; a gas storing tank to store solar-energy fuel; a power generating apparatus to burnt the solar-energy fuel to output power. The invention achieves a higher efficiency of usage of solar energy.

19 Claims, 3 Drawing Sheets (51) Int. Cl.
*C01B 3/22* (2006.01)
*C01B 3/32* (2006.01)
*F01K 15/00* (2006.01)
*F03G 6/06* (2006.01)

(52) U.S. Cl.
CPC ......... *F03G 6/065* (2013.01); *C01B 2203/0855* (2013.01); *C01B 2203/1005* (2013.01); *Y02P 20/134* (2015.11)

(56) References Cited

U.S. PATENT DOCUMENTS 8,286,429 B2 * 10/2012 Heide .................... F01K 23/10
  60/39.182
2012/0131898 A1 * 5/2012 Mokheimer .............. F02C 1/05
  60/39.12

* cited by examiner

POWER GENERATING SYSTEM AND METHOD BY COMBINING MEDIUM-AND-LOW TEMPERATURE SOLAR ENERGY WITH FOSSIL FUEL THERMOCHEMISTRY

CROSS REFERENCE TO RELATED APPLICATION

This application is a U.S. national stage application of International Application No. PCT/CN2012/084522 filed on Nov. 13, 2012.

FIELD OF THE INVENTION

The present invention relates to solar energy field, and in particular, to a power generating system and method by combining medium-and-low temperature solar energy with fossil fuel thermochemistry. More particularly, the present invention relates to a system and method of converting low or medium grade solar energy to high-grade solar-energy fuel and achieving generation of electrical energy using a solar-energy light-collecting device with a low concentrating ratio.

BACKGROUND

With development and progress of human society, due to improvement in life quality and promotion of society development, demand for energy source from people is increasing. However, the traditional fossil fuel is limited by gross output and its non-renewability while consumption of them leading to serious contamination product and greenhouse gas emissions. The sharp contradiction between current imminent depletion of fossil fuel and increasing demand for energy source from human and environmental protection occurs, seriously affecting the sustainable development of human society. Development and utilization of solar energy and other clean renewable energy is an important way to alleviate energy shortage, protect the natural environment and achieve sustainable development.

Solar energy is characterized to be unlimited reserve and clean energy, and thus is important to be exploited and developed for meeting increasing demand for energy source and reducing greenhouse gas discharge. However, due to low power density, instability and discontinuity of solar energy, it has a low annual generating efficiency of 10%-17% and high storage cost for individual usage of solar energy.

Solar energy thermochemistry technology is a type of solar energy thermal usage technology, by which collected solar energy is converted to chemical energy of fuel by an endothermic chemical reaction and the converted fuel can be stored and used for electricity generating with high efficiency, thereby achieving high efficient usage of solar energy and storage of solar thermal energy.

Nowadays study on solar energy thermochemical technology is focused on high temperature thermochemical technology, which is performed at a reactive temperature above 600° C. The technology mainly relates to water decomposition to generate hydrogen by solar energy and solar energy driven hydrogen generation with fossil fuel, etc. However, the high temperature thermochemical process is performed on the premise of using expensive solar energy collecting device while there are difficulties and bottlenecks of low heat-collecting efficiency, inconvenience of sun tracking and high requirement on material of reactors, etc, leading to less application of the technology.

SUMMARY OF THE DISCLOSURE

Accordingly, it is an object of the present invention to provide a power generating system and method by combining medium-and-low temperature solar energy and fossil fuel with thermochemical process, which remarkably improves generating efficiency with respect to solar energy, reduces operation temperature to save generating electricity cost, and overcome the technical bottle-neck of output instability of the solar energy generating system through chemical energy storage.

In order to achieve the above objects, a power generating system by combing medium-and-low temperature solar energy with thermochemical process is provided, comprising:

a material supply device configured to store fossil fuel and output the stored fossil fuel to a material mixing device;

a material mixing device configured to receive and mix the fossil fuel from the material supply device with the non-reacted reactant separated from a gas-liquid separating device and output the resultant mixture to a material metering device;

a material metering device configured to control an amount of material fed to a material preheating device in unit time, so as to output the mixed material received from the material mixing device in a certain flow rate to a material preheating device;

a material preheating device configured to heat the material received from the material metering device by using the exhaust heat from the power generating apparatus, to generate fossil fuel vapor and output it to a solar energy absorption and reaction device;

a solar energy absorption and reaction device configured to drive the fossil fuel vapor received from the material preheating device by using solar thermal energy absorbed to make a decomposition reaction or reforming reaction by catalysts, through which the solar energy is converted to chemical energy of hydrogen-rich fuel, obtaining solar-energy fuel;

a solar energy heat collecting device configured to collect the solar energy with low energy flux density to medium-and-low temperature solar thermal energy with high energy flux density in manner of line focus, so as to provide heat to the reaction of conversion of a fossil fuel to a solar-energy fuel in the solar energy absorption and reaction device;

a condenser configured to cool reaction products from the solar energy absorption and reaction device and output the cooled reaction products to the gas-liquid separating device;

a gas-liquid separating device configured to perform gas-liquid separation for the cooled mixture received from the condenser and output the separated gas phase reaction products and liquid phase reaction products to the fuel bypassing device and the material mixing device, respectively;

a fuel bypassing device configured to control the flow of the solar-energy fuel to the power generating apparatus and the gas storing tank according to the solar energy source and energy demands from user, so as to achieve adjustment and control of the power generating system by combining solar energy and fossil fuel with thermochemical process;

a gas storing tank configured to store the excess solar-energy fuel when solar energy source is abundant, achieving chemical energy storage, and, when solar energy source is not sufficient, complement the solar-energy fuel in the gas storing tank to the power generating apparatus, thereby achieving output control of the system;

a power generating apparatus configured to drive a generating set to generate power by using solar-energy fuel as fuel and output electrical power.

In order to achieve the above objects, there is a power generating method provided by combining medium-and-low temperature solar energy and fossil fuel with thermochemical energy, implemented in the mentioned power generating system, the method comprises:

step A: the fossil fuel provided from the material supply device is mixed with the non-reacted reactant input from the gas-liquid separating device by the material mixing device, and the mixture is output to the material metering device;

Step B: the mixed material input by the material mixing device is output in a certain flow rate by the material metering device to the preheating device and is preheated by the preheating device, and then output to the solar energy absorption and reaction device;

Step C: the solar energy is collected by the solar energy absorption and reaction device to supply to a decomposition reaction or reforming reaction of the material from the preheating device in itself reactive tube, and the reaction products are directed to the condenser;

Step D: the reaction products from the solar energy absorption and reaction device are cooled by the condenser and then the cooled reaction products are output to the gas-liquid separating device;

Step E: the cooled reaction products received from the condenser is performed a gas-liquid separation in the gas-liquid separating device, in which, after being separated, the reaction products in gas phase are output to the fuel bypassing device and the reaction products in liquid phase are output to the material mixing device;

Step F: a certain amount of solar-energy fuel is controlled by the fuel bypassing device to flow towards the power generating apparatus, such that the excess solar-energy fuel is directed to flow towards the gas storing tank, or, otherwise, the solar-energy fuel stored in the gas storing tank is complementarily flowed towards the power generating apparatus;

Step G: the solar-energy fuel from the fuel bypassing device is burnt in the power generating apparatus to output electrical energy, and the discharged exhaust heat are routed to the material preheating device to preheat material.

With the above technical scheme, the following advantages can be obtained by the present invention:

1. With respect to energy conversion, chemical energy of materials, such as, methanol, ethanol or dimethyl ether, is converted upon endothermic reaction to that of solar-energy fuel, while solar thermal energy that drives the endothermic reaction being also converted to chemical energy and stored in the reaction products. The system according to the present invention obtains advantage in terms of first law of thermodynamics of increasing energy contained in reaction products; and obtains advantage in terms of second law of thermodynamics of upgrading solar thermal energy, where low-grade solar thermal energy is upgraded to high-grade fuel chemical energy through endothermic reaction of conversion from materials, such as, methanol, ethanol or dimethyl ether, to solar-energy fuel, thereby remarkably, enhancing solar energy net generating efficiency.

2. According to the present invention, solar energy heat collecting device is configured in a parabolic trough type light collecting structure, i.e. a single-axis tracking solar energy parabolic trough light collecting device, which has a simple structure and is coated with a selective coating with a high reflectivity and low absorptivity for sun light and is configured to supply heat energy at temperature from 150° C. to 300° C. to the material in the solar energy absorption and reaction device for material conversion reaction. By compared with a high temperature solar energy heat collecting device, the present invention is advantageous in low manufacturing and transportation costs and wide usage and application of the products, such as hydrogen, is available.

3. According to the present invention, the solar energy absorption and reaction device is formed by integrating a solar energy absorption device with a reactor apparatus, and the integrated apparatus located at the focus axis of the solar energy light collecting device is not only a solar energy receiving device, but also a reactor. In this configuration, the collected light with high energy flux density is directly irradiated on the solar energy absorption and reaction device and is directly supplied to endothermic reaction, thereby achieving a single system operation flow, largely reducing cost for using heat medium while avoiding heat loss due to storage and transfer of heat medium. Furthermore, it is propitious to implement decomposition or reforming reaction, achieve coupling the heat transfer and reaction, and obtain a better solar energy conversion.

4. According to the present invention, when solar energy source is sufficient and amount of solar-energy fuel generated is beyond the fuel demand of the power generating set, the excess solar-energy fuel is entered to a gas storing tank, thereby achieving chemical energy storage; otherwise, when solar energy source is not sufficient to meet the fuel demand of the power generating set, the solar-energy fuel stored in the gas storing tank is output to the power generating set to implement complement of fuel, thereby achieving adjustment and control for operation of the power generating system the power generating system by combining solar energy and fossil fuel with thermochemical process and overcome the technical bottle-neck of output instability of the solar energy generating system. Due to discontinuity of solar energy source supply, the power generating system by combining medium-and-low temperature solar energy and fossil fuel with thermochemical process has to start and stop periodically. When started, the gas storing tank outputs solar-energy fuel to power generating apparatus and generates flue gas and vapor to preheat material, avoiding consuming extra energy to start the system.

5. The present invention has further advantages for those users or plants demanding power supply on small and medium scale; users demanding gas fuel while lacking fuel gas access condition (for example, users located outskirts, areas where gas supply is not available and areas where the landform conditions, such as, mountain and island, are unfavorable to supply gas), users in area with a good solar irradiance source (for example, most areas in China, particular western area).

BRIEF DESCRIPTION OF THE DRAWINGS

In FIGS. 1 and 3, number symbol are denoted as following: 1 a material tank, 2 a material mixing device, 3 a material metering device, 4 a material preheating device, 5 a solar energy heat collecting device, 6 a solar energy absorption and reaction device, 7 a condenser, 8 a gas-liquid separating device, 9 a fuel bypassing device, 10 a gas storing tank, and 11 a power generating apparatus.

DETAILED DESCRIPTION OF THE PREFERRED EMBODIMENT

In order to further convey to those skilled in the art the purposes, technical schemes and advantages of the present invention, detailed description is made in conjunction with embodiments by reference to adjunctive drawing.

Figure 1:
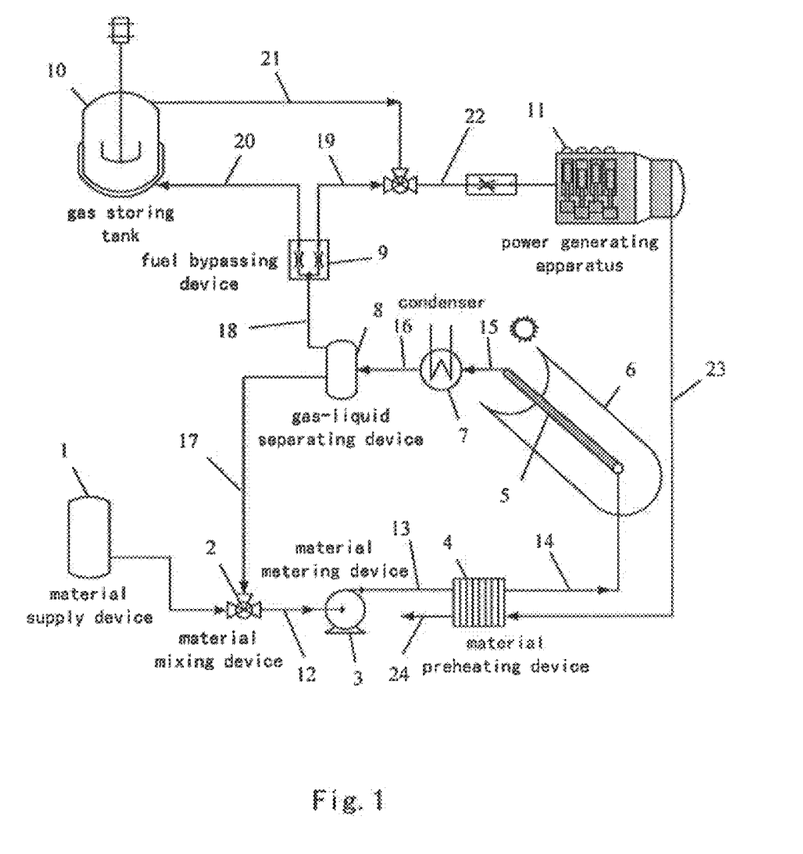
FIG. 1 is a schematic structural view of a power generating system by combining medium-and-low temperature solar energy and fossil fuel with thermochemical process according to the present invention.

As shown in FIG. 1, a structural schematic view of a power generating system by combining medium-and-low-temperature solar energy and fossil fuel with thermochemical process is shown, comprising a material supply device 1, a material mixing device 2, a material metering device 3, a material preheating device 4, a solar energy absorption and reaction device 5, a solar energy heat collecting device 6, a condenser 7, a gas-liquid separating device 8, a fuel bypassing device 9, a gas storing tank 10 and a power generating apparatus 11.

In this system, the material supply device 1 is provided to store fossil fuel and supply the stored fossil fuel to the material mixing device 2. The material supply device is a fuel tank, in which the stored fossil fuel may be methanol, ethanol, or dimethyl ether, etc.

The material mixing device 2 is configured to receive and mix fossil fuel from the material supply device 1 with the remained and non-reacted reactant separated from the gas-liquid separating device 8, and output the resultant mixture to the material metering device 3. The material mixing device 2 is a mixing device for mixing the fossil fuel received from the material tank and the remained and non-reacted reactant separated from the gas-liquid separating device 8.

The material metering device 3 is configured to control the amount of material entering the preheating device 4 in unit time, i.e., to output the material received from the material mixing device 2 at a certain flow rate according to the solar energy source and requirements of user to the preheating device 4. The material metering device 3 may be a metering pump to pump material to a heat exchanger of the material preheating device 4, and output material according to solar energy source and requirements of user.

The material preheating device 4 heats the material from the material metering device 3 by using the exhaust heat of discharged flue gas of the power generating apparatus 11 and produces fossil fuel vapor to output to the solar energy absorption and reaction device 5. The material preheating device 4 includes a heat exchanger and exchanges heat energy with material by using the discharged flue gas of the power generating apparatus, so as to produce fossil fuel vapor to output to the solar energy absorption and reaction device.

The solar energy absorption and reaction device 5 drives the fossil fuel vapor received from the material preheating device 4 using solar thermal energy absorbed to make a decomposition reaction or reforming reaction by catalysts, through which the solar energy is converted to chemical energy of hydrogen-rich fuel, obtaining solar-energy fuel. The solar energy absorption and reaction device is a chemical reactor with a tube-like structure and made of material with good thermal conduction, such as Steel, Copper, and Aluminum. The tube-like structure is filled with a metal-based catalyst I, such as Copper-based, Nickel-based, Platina-Palladium-based catalyst, etc., and is plated or coated with a coating film with high absorptivity and low reflectivity and emissivity. The tube-like structure is also mounted with a glass mask outside with high transmission, wherein a vacuum or a non-vacuum is provided between the glass mask and the tube-like structure.

The solar energy heat collecting device 6 is used to collect the solar energy with low energy flux density to medium-and-low temperature solar thermal energy with high energy flux density in manner of line focus, no as to provide heat to the reaction of conversion of a fossil fuel to a solar-energy fuel in the solar energy absorption and reaction device 5. The solar energy heat collecting device 6 is configured in a parabolic trough type light collecting structure, in which the solar energy absorption and reaction device 5 is located a linear focus line of the solar energy heat collecting device. The inner surface of the parabolic trough type light collecting structure is coated with a selective coating with a high reflectivity and low absorptivity and is configured to supply heat energy at temperature from 150° C. to 300° C. to the material in the solar energy absorption and reaction device for material conversion reaction.

The condenser 7 is provided to cool reaction products from the solar energy absorption and reaction device 5 and output the cooled reaction products to the gas-liquid separating device 8. The condenser is a surface type heat exchanger, which performs cooling by circulating water and is connected with circling cool water.

The gas-liquid separating device 8 is configured to perform gas-liquid separation for the cooled mixture received from the condenser 7 and output the separated gas phase reaction products and liquid phase reaction products to the fuel bypassing device 9 and the material mixing device 2, respectively. The gas phase reaction products obtained by separating by the gas-liquid separating device include solar-energy fuels, such as, hydrogen gas, carbon monoxide, etc., and a small amount of a small amount of byproduct. The liquid phase reaction products include non-reacted fuel and water, etc.

The fuel bypassing device 9 is configured to control the flow of the solar-energy fuel to the power generating apparatus 11 and the gas storing tank 10 according to the solar energy source and energy demands from user, so as to achieve adjustment and control of the power generating system the power generating system by combining solar energy and fossil energy with thermochemical process. The fuel bypassing device may be a flow rate regulating valve, which controls the flow rate of the solar-energy fuel to the power generating apparatus such that the excess solar-energy fuel is directed to the gas storing tank to be stored, and, otherwise, when the solar energy source is not sufficient, the stored solar-energy fuel is controlled to complement to the power generating apparatus, thereby meeting the fuel demand of the power generating apparatus.

The gas storing tank 10 stores the excess solar-energy fuel when solar energy source is abundant, achieving chemical energy storage. When solar energy source is not sufficient, the solar-energy fuel in the gas storing tank 10 is complemented to the power generating apparatus 11, thereby achieving output control of the system. The gas storing tank may be a pressure-tight vessel for storing solar-energy fuel from the fuel bypassing device so as to achieve energy storage, and is configured to output the solar-energy fuel stored to complement fuel for the power generating apparatus as the solar energy source is not sufficient.

The power generating apparatus 11 is configured to drive a generating set to generate by using solar-energy fuel as fuel and output electrical power. The power generating apparatus may be an internal combustion engine generating set or a micro gas turbine generating set, which burns the solar-energy fuel to generate and output electrical energy.

Figure 2:
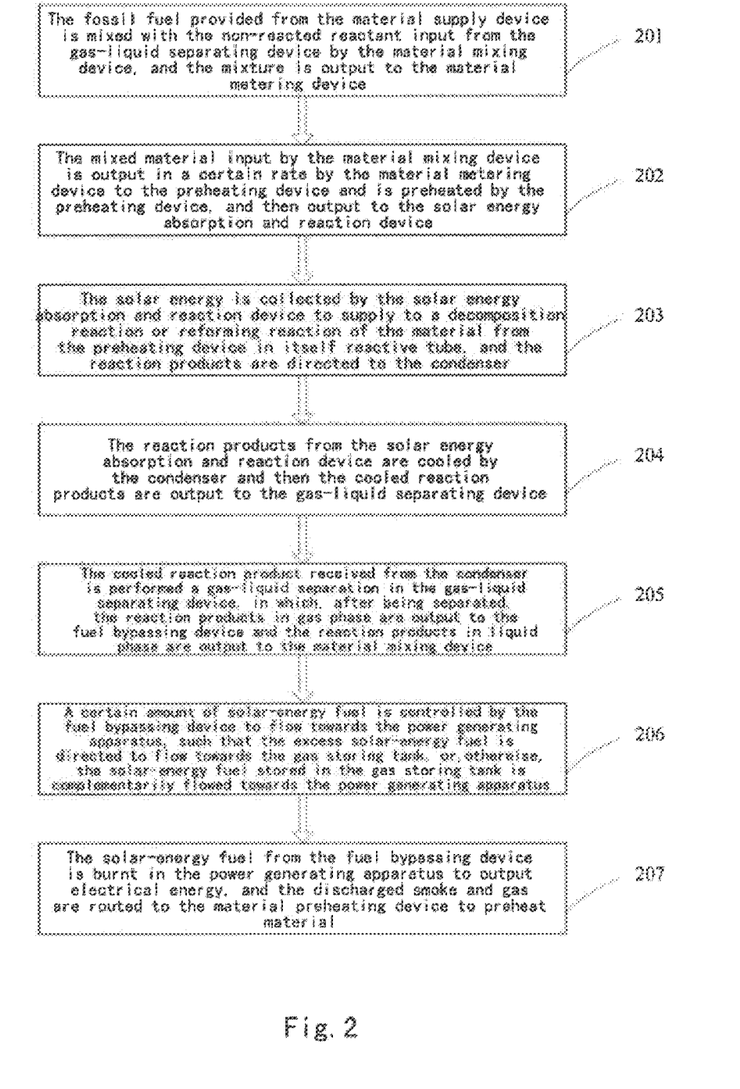
FIG. 2 is a flow chart of a power generating method by combining medium-and-low temperature solar energy and fossil fuel with thermochemical process according to the present invention.

Based on the schematic structural graph of the power generating system by combining medium-and-low temperature solar energy and fossil fuel with thermochemical process in FIG. 1, FIG. 2 illustrates a flow chart of a power generating method by combining medium-and-low temperature solar energy and fossil fuel with thermochemical process according to the present invention. The method comprises the following steps.

In step 201, the fossil fuel provided from the material supply device is mixed with the non-reacted reactants input from the gas-liquid separating device by the material mixing device, and the mixture is output to the material metering device;

In step 202, the mixed material input by the material mixing device is output in a certain rate by the material metering device to the preheating device and is preheated by the preheating device, and then output to the solar energy absorption and reaction device;

In step 203, the solar energy is collected by the solar energy absorption and reaction device to supply to a decomposition reaction or reforming reaction of the material from the preheating device in itself reactive tube, and the reaction products are directed to the condenser;

In step 204, the reaction products from the solar energy absorption and reaction device are cooled by the condenser and then the cooled reaction products are output to the gas-liquid separating device;

In step 205, the cooled reaction product received from the condenser is performed a gas-liquid separation in the gas-liquid separating device, in which, after being separated, the reaction products in gas phase are output to the fuel bypassing device and the reaction products in liquid phase are output to the material mixing device;

In step 206, a certain amount of solar-energy fuel is controlled by the fuel bypassing device to flow towards the power generating apparatus, such that the excess solar-energy fuel is directed to flow towards the gas storing tank, or, otherwise, the solar-energy fuel stored in the gas storing tank is complementarily flowed towards the power generating apparatus;

In step 207, the solar-energy fuel from the fuel bypassing device is burnt in the power generating apparatus to output electrical energy, and the discharged flue gas are routed to the material preheating device to preheat material;

The material supply device in step 201 may be a fuel tank, in which the stored fossil fuel may be methanol, ethanol, or dimethyl ether, etc. The material mixing device in step A may be a mixer configured to mix the fossil fuel received from the material tank with the non-reacted reactants separated from the gas-liquid separating device.

The material metering device in step 202 may be a meter pump configured to pump material to the heat exchanger of the material preheating device and adjust the flux of the output material according to the solar energy source and user's demand.

Step 203 further includes: the material output from the material preheating device to the solar energy absorption and reaction device is transformed to vapor upon being preheated by the material preheating device and evaporated by the solar energy absorption and reaction device, which is then subjected to decomposition reaction or reformed reaction using solar energy collected by the solar energy heat collecting device under catalyzing action of solid metal based catalyst such as Copper-based, Nickel-based or Platinum-Palladium-based at temperature ranged from 150° C. to 300° C., obtaining gas phase reaction products of solar-energy fuel hydrogen, carbon monoxide and a small amount of byproducts and the liquid phase reaction products of non-reacted fossil fuel and water. The mixture is entered from the solar energy absorption and reaction device to the condenser.

In step 204, the condenser is a surface type heat exchanger, which uses circulating water to cool and is connected with circled cool water.

In step 205, the gas phase reaction products are solar-energy fuel, such as, hydrogen, carbon monoxide, and a small amount of byproduct and the liquid phase reaction products are non-reacted fossil fuel and water, etc.

in step 206, the fuel bypassing device may be a flow ratio regulating valve, which controls the flow of the solar-energy fuel to the power generating apparatus such that the excess solar-energy fuel is directed to the gas storing tank to be stored, and the stored solar-energy fuel to be complemented to the power generating apparatus as the solar energy is not sufficient so as to meet the fuel demand of the power generating apparatus. The gas storing tank may be a pressure-tight vessel, which is equipped with a safety valve and a pressure meter, and is used to store the solar-energy fuel bypassed from the fuel bypassing device so as to achieve energy storage and to output the solar-energy fuel to complement fuel to the power generating apparatus in condition of solar energy insufficiency.

In step 207, the power generating apparatus may be an internal combustion engine generating set, which burns solar-energy fuel to output electrical energy and discharges the exhaust heat to material preheating device to preheat the material. The power generating apparatus also may be a micro gas turbine generating set.

Based on the schematic structural graph of the power generating system by combining medium-and-low temperature solar energy and fossil fuel with thermochemical process in FIG. 1 and a flow chart of a power generating method by combining medium-and-low temperature solar energy and fossil fuel with thermochemical process in FIG. 2, detailed illustration of the generating method by combining medium-and-low temperature solar energy and fossil fuel with thermochemical process according to the present invention is further discussed in conjunction with the specific embodiments.

Embodiments

Figure 3:
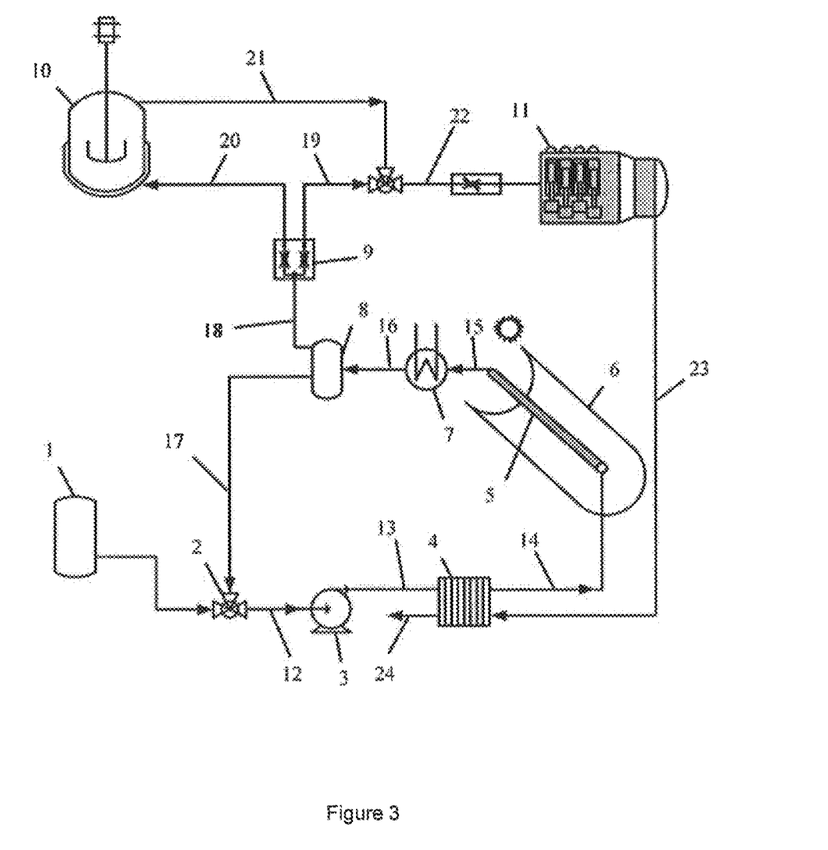
FIG. 3 is a schematic view illustrating a power generating system by combining medium-and-low temperature solar energy and fossil fuel with thermochemical process according to the present invention.

In this embodiment, medium-and-low temperature solar energy is complemented to methanol to prepare a synthesis gas of $H_2$ and CO at mole ratio of 2:1 of $H_2$ to CO as solar-energy fuel and an internal combustion engine generating set is used as a power generating apparatus to achieve electrical energy output. As shown in FIG. 3, FIG. 3 is a schematic view of the power generating system by combining the medium-and-low temperature solar energy with thermochemical energy of methanol.

The methanol in the material supply device 1 is fully mixed with the liquid phase reaction products from the gas-liquid separating device 8 and then passed through a conduit 12, output to the material preheating device 4 by the material metering device 3 via a conduit 13 at a flow ratio of 5.57 l/min. The mixture of methanol and reaction products exchange heat with emission flue gas at temperature of 450° C. from the internal combustion engine and then methanol vapor obtained is entered via a conduit 14 to the solar energy absorption and reaction device 5. The solar energy with high energy flux density collected by the solar energy heat collecting device 6 is absorbed by the reactor 6 and transformed to heat energy, which is used as reaction heat to drive a endothermic decomposition reaction of methanol under action of a Copper-based catalyst, generating a synthesis gas of solar-energy fuel of $H_2$ and CO with mole ratio of about 2:1 of $H_2$ to CO. The synthesis gas of solar-energy fuel is then passed through a conduit 15 to the condenser 7 to be cooled by the circling cool water, and the cooled mixture is passed via a conduit 16 to the gas-liquid separating device 8 to be implemented a gas-liquid separation. The separated liquid phase reaction products include non-reacted methanol and a small amount of byproducts and liquid phase reaction products are returned to the material mixing device 2 via a conduit 17. The gas phase reaction products mainly include a synthesis gas of $H_2$ and CO with mole ratio of about 2:1 of $H_2$ to CO. The synthesis gas of solar-energy fuel is passed through a conduit 18 to the fuel bypassing device 9, and controlled to be flowed towards the internal combustion engine generating set 11 to achieve electrical energy output or towards the gas storing tank 10 to be stored by operation of the fuel bypassing device 9 according to the fuel demand of the internal combustion engine generating set 11. When the solar energy source is not sufficient, the synthesis gas of solar-energy fuel stored in the gas storing tank 10 is passed through a conduit 21 to mix with a real-time generating synthesis gas, so as to complement to the internal combustion engine generating set 11 to meet fuel demand, and flowed towards the internal combustion engine generating set 11 via a conduit 22, in which the synthesis gas burns to work for generating electrical energy. The exhaust flue gas at 450° C. of the internal combustion engine generating set 11 is routed to the material preheating device 4 to be used for preheat the methanol fuel and finally exhausted into environment by a conduit 24.

The advantages of the present invention may be illustrated in the following embodiments:

A parabolic trough solar energy heat collecting device with a concentrating ratio of 82:1 is provided, in which heat collecting device opening width is 5.76 meter, mirror field area is 715 $m^2$ and mirror field length is 124 m. The material is liquid industrial methanol with a concentration of 99.9% at room temperature. The solar energy absorption and reaction device is filled with solid metal serious catalyst of $Cu/ZnO/Al_2O_3$, the internal combustion engine generating set has a electricity generating efficiency of 42% and an exhaust flue gas at temperature of 450° C.

The liquid phase products separated from the lower end of the separating device mainly include non-reacted methanol and a small amount of liquid byproducts and the gas phase products separated from the upper end of the separating device mainly include $H_2$ and CO.

In this embodiment, for example, when solar irradiation is 600 $W/m^2$ and feeding amount of methanol is 5.57 l/min, the solar energy absorption and reaction device may product 267 kg/hr synthesis gas of solar-energy fuel, of which 43 kg/hr is input to the gas storing tank for chemical energy storage and 224 kg/hr is input to the internal combustion engine generating set to be burnt for working. The internal combustion engine generator may output 600 kW electrical power. That is, net electricity generating efficiency of solar energy is up to 28%, which is much higher than 10-17% for conventional solar thermal power technology. When solar irradiation is increased to 900 $W/m^2$, the solar energy absorption and reaction device may produce 401 kg/hr synthesis gas of solar-energy fuel. In this situation, the mass flow of the solar-energy fuel flowed to the gas storing tank is increased to 177 kg/hr and that for the internal combustion engine generating set is still 224 kg/hr. When solar irradiation is decreased to 300 $W/m^2$, the solar energy absorption and reaction device may produce 134 kg/hr synthesis gas of solar-energy fuel. At this time, the mass flow of the solar-energy fuel flowed to the gas storing tank is 0 kg/hr, and the gas storing tank is configured to output synthesis gas of solar-energy fuel in mass flow of 90 kg/hr, such that the mass flow of the synthesis gas of solar-energy fuel flowed to the internal combustion engine generating set is still 224 kg/hr. By this way, the power generating set may be stably operated at design operating condition, thus overcoming the technical bottleneck of serious degradation of performance of the power generating apparatus and achieving adjusting operation of the power generating system by combining medium-and-low temperature solar energy and fossil fuel with thermochemical process in condition of varying irradiation.

The present invention can be used in various applications, particularly used for small-scale electrical supply in country. A new way for electrically generating by combining medium-and-low temperature solar energy and fossil fuel with thermochemical process is provided.

The above specific embodiments are provided to further illustrate the objects, technical schemes and advantages of the present inventions. It is understood that the above illustration should be specific embodiments, not limiting to the present invention, any changes and modifications to the embodiments according to the spirits and principles of the invention should fall within the scope of the present invention.

The invention claimed is:

1. A generating system by combining medium-and-low temperature solar energy and fossil fuel with thermochemical process, comprising:
   a material supply device configured to store fossil fuel and output the stored fossil fuel to a material mixing device;
   a material mixing device configured to receive and mix the fossil fuel from the material supply device with non-reacted reactant separated from a gas-liquid separating device and output the resultant mixture to a material metering device;
   a material metering device configured to control an amount of material fed to a material preheating device in unit time, so as to output the mixed material received from the material mixing device in a certain rate to a material preheating device;
   a material preheating device configured to heat the material received from the material metering device by using the exhaust heat from the power generating apparatus, to generate fossil fuel vapor and output it to a solar energy absorption and reaction device;
   a solar energy absorption and reaction device configured to drive the fossil fuel vapor received from the material preheating device by using solar thermal energy absorbed to make a decomposition reaction or reforming reaction by catalysts, through which the solar energy is converted to chemical energy of hydrogen-rich fuel, obtaining solar-energy fuel;
   a solar energy heat collecting device configured to collect the solar energy with low energy flux density to medium-and-low temperature solar thermal energy with high energy flux density in manner of line focus, so as to provide heat to the reaction of conversion of a fossil fuel to a solar energy in the solar energy absorption and reaction device;
   a condenser configured to cool reaction products from the solar energy absorption and reaction device and output the cooled reaction products to the gas-liquid separating device;
   a gas-liquid separating device configured to perform gas-liquid separation for the cooled mixture received from the condenser and output the separated gas phase reaction products and liquid phase reaction products to the fuel bypassing device and the material mixing device, respectively;

a fuel bypassing device configured to control the flow of the solar-energy fuel to the power generating apparatus and the gas storing tank according to the solar energy source and energy demands from user, so as to achieve adjustment and control of the power generating system by combining solar energy and fossil fuel with thermochemical process;

a gas storing tank configured to store the excess solar-energy fuel when solar energy source is abundant, achieving chemical energy storage, and, when solar energy source is not sufficient, complement the solar-energy fuel in the gas storing tank to the power generating apparatus, thereby achieving output control of the system; and a power generating apparatus configured to drive a generating set to generate by using solar-energy fuel as fuel and output electrical power.

2. The power generating system by combining medium- and-low temperature solar energy and fossil fuel with thermochemical process according to claim 1, wherein
the material supply device is a fuel tank, in which the stored fossil fuel is methanol, ethanol or dimethyl ether.

3. The power generating system by combining medium- and-low temperature solar energy and fossil fuel with thermochemical process according to claim 1, wherein
the material mixing device is a mixing device for mixing the fossil fuel received from the material tank and the remained and non-reacted reactant separated from the gas-liquid separating device.

4. The power generating system by combining medium- and-low temperature solar energy and fossil fuel with thermochemical process according to claim 1, wherein
the material metering device is a meter pump, which pumps material to the heat exchanger of the material preheating device and adjusts the flow of material output according to solar energy source and requirements of user.

5. The power generating system by combining medium- and-low temperature solar energy and fossil fuel with thermochemical process according to claim 1, wherein
the material preheating device includes a heat exchanger and exchanges heat energy with material by using the exhaust heat of the power generating apparatus, so as to produce fossil fuel vapor to output to the solar energy absorption and reaction device.

6. The power generating system by combining medium- and-low temperature solar energy and fossil fuel with thermochemical process according to claim 1, wherein
the solar energy absorption and reaction device is a chemical reactor with a tube-like structure and made of steel, Copper, or Aluminum, in which the tube-like structure is filled with solid metal-based catalyst including any of Copper-based, Nickel-based, Platina-Palladium-based and the tube-like structure is coated with a coating film with high absorptivity and low reflectivity and emissivity and is also mounted with a glass mask outside with high transmission with a vacuum or a non-vacuum between the glass mask and the tube-like structure.

7. The power generating system by combining medium- and-low temperature solar energy and fossil fuel with thermochemical process according to claim 1, wherein
the solar energy heat collecting device is configured in a parabolic trough type light collecting structure, in which the solar energy absorption and reaction device is located a linear focus line of the solar energy heat collecting device, and the inner surface of the parabolic trough type light collecting structure is coated with a selective coating with a high reflectivity and low absorptivity and is configured to supply heat energy at temperature from 150° C. to 300° C. to the material in the solar energy absorption and reaction device for material conversion reaction.

8. The power generating system by combining medium- and-low temperature solar energy and fossil fuel with thermochemical process according to claim 1, wherein
the condenser is a surface type heat exchanger, which performs cooling by circulating water and is connected to circling cool water.

9. The power generating system by combining medium- and-low temperature solar energy and fossil fuel with thermochemical process according to claim 1, wherein
gas phase reaction products and liquid phase reaction products are obtained after separated by the gas-liquid separating device, in which the gas phase reaction products include solar-energy fuels, hydrogen gas, carbon monoxide and a small amount of byproduct and the liquid phase reaction products include non-reacted fuel and water.

10. The power generating system by combining medium- and-low temperature solar energy and fossil fuel with thermochemical process according to claim 1, wherein
the fuel bypassing device is a flow rate regulating valve, which controls the flow rate of the solar-energy fuel to the power generating apparatus such that the excess solar-energy fuel is directed to the gas storing tank to be stored, and, otherwise, when the solar energy source is not sufficient, the stored solar-energy fuel is controlled to complement to the power generating apparatus, thereby meeting the fuel demand of the power generating apparatus.

11. The power generating system by combining medium- and-low temperature solar energy and fossil fuel with thermochemical process according to claim 1, wherein
the gas storing tank is a pressure-tight vessel for storing solar-energy fuel from the fuel bypassing device so as to achieve energy storage, and is configured to output the solar-energy fuel stored to complement fuel for the power generating apparatus as the solar energy source is not sufficient.

12. The power generating system by combining medium- and-low temperature solar energy and fossil fuel with thermochemical process according to claim 1, wherein
the power generating apparatus is an internal combustion engine generating set or a micro gas turbine generating set, which burns the solar-energy fuel to generate and output electrical energy.

13. The power generating method by combining medium- and-low temperature solar energy and fossil fuel with thermochemical process, implemented in the power generating system according to claim 1, comprising:
Step A: the fossil fuel provided from the material supply device is mixed with the non-reacted reactant input from the gas-liquid separating device by the material mixing device, and the mixture is output to the material metering device;
Step B: the mixed material input by the material mixing device is output in a certain rate by the material metering device to the preheating device and is preheated by the preheating device, and then output to the solar energy absorption and reaction device;
Step C: the solar energy is collected by the solar energy absorption and reaction device to supply to a decomposition reaction or reforming reaction of the material from the preheating device in itself reactive tube, and the reaction products are directed to the condenser;

Step D: the reaction products from the solar energy absorption and reaction device are cooled by the condenser and then the cooled reaction products are output to the gas-liquid separating device;

Step E: the cooled reaction product received from the condenser is performed a gas-liquid separation in the gas-liquid separating device, in which, after being separated, the reaction products in gas phase are output to the fuel bypassing device and the reaction products in liquid phase are output to the material mixing device;

Step F: a certain amount of solar-energy fuel is controlled by the fuel bypassing device to flow towards the power generating apparatus, such that the excess solar-energy fuel is directed to flow towards the gas storing tank, or, otherwise, the solar-energy fuel stored in the gas storing tank is complementarily flowed towards the power generating apparatus; and Step G: the solar-energy fuel from the fuel bypassing device is burnt in the power generating apparatus to output electrical energy, and the discharged exhaust heat are routed to the material preheating device to preheat material.

14. The generating method with medium-and-low temperature solar energy complementing fossil fuel with thermochemical process according to claim 11, wherein
the material supply device in step A is a fuel tank, in which the stored fossil fuel is methanol, ethanol, or dimethyl ether; and the material mixing device in step A is a mixer configured to mix the fossil fuel received from the material tank with the non-reacted reactant separated from the gas-liquid separating device.

15. The generating method with medium-and-low temperature solar energy complementing fossil fuel with thermochemical process according to claim 11, wherein
the material metering device in step B is a meter pump configured to pump material to the heat exchanger of the material preheating device and adjust the flux of the output material according to the solar energy source and user's demand.

16. The generating method with medium-and-low temperature solar energy complementing fossil fuel with thermochemical process according to claim 11, wherein
step C further includes: the material output from the material preheating device to the solar energy absorption and reaction device is transformed to vapor upon being preheated by the material preheating device and evaporated by the solar energy absorption and reaction device, which is then subjected to decomposition reaction or reformed reaction using solar energy collected by the solar energy heat collecting device under catalyzing action of solid metal type catalyst of Copper serious, Nickel serious or Platinum-Palladium serious at temperature ranged from 150° C. to 300° C., obtaining gas phase reaction products of solar-energy fuel hydrogen, carbon monoxide and a small amount of byproduct and the liquid phase reaction products of non-reacted fossil fuel and water, in which the mixture is entered from the solar energy absorption and reaction device to the condenser.

17. The generating method with medium-and-low temperature solar energy complementing fossil fuel with thermochemical process according to claim 11, wherein
in step D, the condenser is a surface type heat exchanger, which uses circulating water to cool and is connected with circled cool water.

18. The generating method with medium-and-low temperature solar energy complementing fossil fuel with thermochemical process according to claim 11, wherein
in step F, the fuel bypassing device is a flow ratio regulating valve, which controls the flow of the solar-energy fuel to the power generating apparatus such that the excess solar-energy fuel is directed to the gas storing tank to be stored, and the stored solar-energy fuel to be complemented to the power generating apparatus as the solar energy is not sufficient so as to meet the fuel demand of the power generating apparatus;
in step F, the gas storing tank is a pressure-tight vessel, which is configured to store the solar-energy fuel bypassed from the fuel bypassing device so as to achieve energy storage and to output the solar-energy fuel to complement fuel to the power generating apparatus in condition of solar energy insufficiency.

19. The generating method with medium-and-low temperature solar energy complementing fossil fuel with thermochemical process according to claim 11, wherein
in step G, the power generating apparatus is an internal combustion engine generating set or a micro gas turbine generating set, which burns solar-energy fuel to output electrical energy and discharges the exhaust heat to material preheating device to preheat the material.

* * * * *